United States Patent [19]

Seko et al.

[11] 4,450,438
[45] May 22, 1984

[54] DROWSINESS ALARM SYSTEM FOR A VEHICLE

[75] Inventors: Yasutoshi Seko, Yokohama; Takayuki Yanagishima, Yokosuka; Noboru Fukasawa, Kamakura, all of Japan

[73] Assignee: Nissan Motor Company, Limited, Kanagawa, Japan

[21] Appl. No.: 309,012

[22] Filed: Oct. 5, 1981

[30] Foreign Application Priority Data

Oct. 6, 1980 [JP] Japan .................................. 55-139663

[51] Int. Cl.³ .............................................. G08B 21/00
[52] U.S. Cl. ...................................... 340/576; 180/272
[58] Field of Search ........................... 340/576; 180/272

[56] References Cited

U.S. PATENT DOCUMENTS

| | | | |
|---|---|---|---|
| 3,106,981 | 10/1963 | Chakiris | 340/576 |
| 3,654,599 | 4/1972 | Sepper . | |
| 3,794,969 | 2/1974 | Klopfenstein et al. . | |
| 3,877,541 | 4/1975 | Takeuchi et al. | 340/576 |
| 3,938,612 | 2/1976 | Boudeville et al. . | |
| 4,005,398 | 1/1977 | Inoue et al. . | |
| 4,007,357 | 2/1977 | Yanagishima . | |
| 4,017,843 | 4/1977 | Yanagishima . | |
| 4,031,527 | 6/1977 | Yanagishima et al. . | |
| 4,058,796 | 11/1977 | Oishi et al. . | |
| 4,104,621 | 8/1978 | Yanagishima et al. | 340/576 |
| 4,278,969 | 7/1981 | Woods . | |

FOREIGN PATENT DOCUMENTS 2042853 of 0000 Fed. Rep. of Germany .

Primary Examiner—Glen R. Swann, III
Attorney, Agent, or Firm—Lowe, King, Price & Becker

[57] ABSTRACT

According to the present invention there is provided a drowsiness alarm system which comprises: (a) a steering angle pulse generation circuit which produces first and second angle pulses at respective output terminals whenever the steering wheel is rotated clockwise and counterclockwise, respectively, through an angle equal to a predetermined angular increment; (b) curved road detection circuit responsive to the first and second steering pulses which counts the number of the first and second steering pulses separately and detects whether the vehicle travels on a curved road depending on whether the counted number of either of the first and second steering pulses reaches a first predetermined number within a predetermined period of time or depending on whether the difference of the counted number between the first and second steering angle pulses reaches a second predetermined number within the predetermined period of time; (c) a first counting circuit which counts the number of the first and second steering angle pulses within the predetermined period of time and outputs a first alarm signal whenever the counted number reaches a third predetermined number; (d) a second counting circuit responsive to the curved road detection circuit which counts the number of the first and second steering angle pulses and outputs a second alarm signal whenever the counted number reaches a fourth predetermined number greater than the third predetermined number; and (e) an alarm unit which produces an alarm to the driver in response to the first or second alarm signal.

11 Claims, 5 Drawing Figures

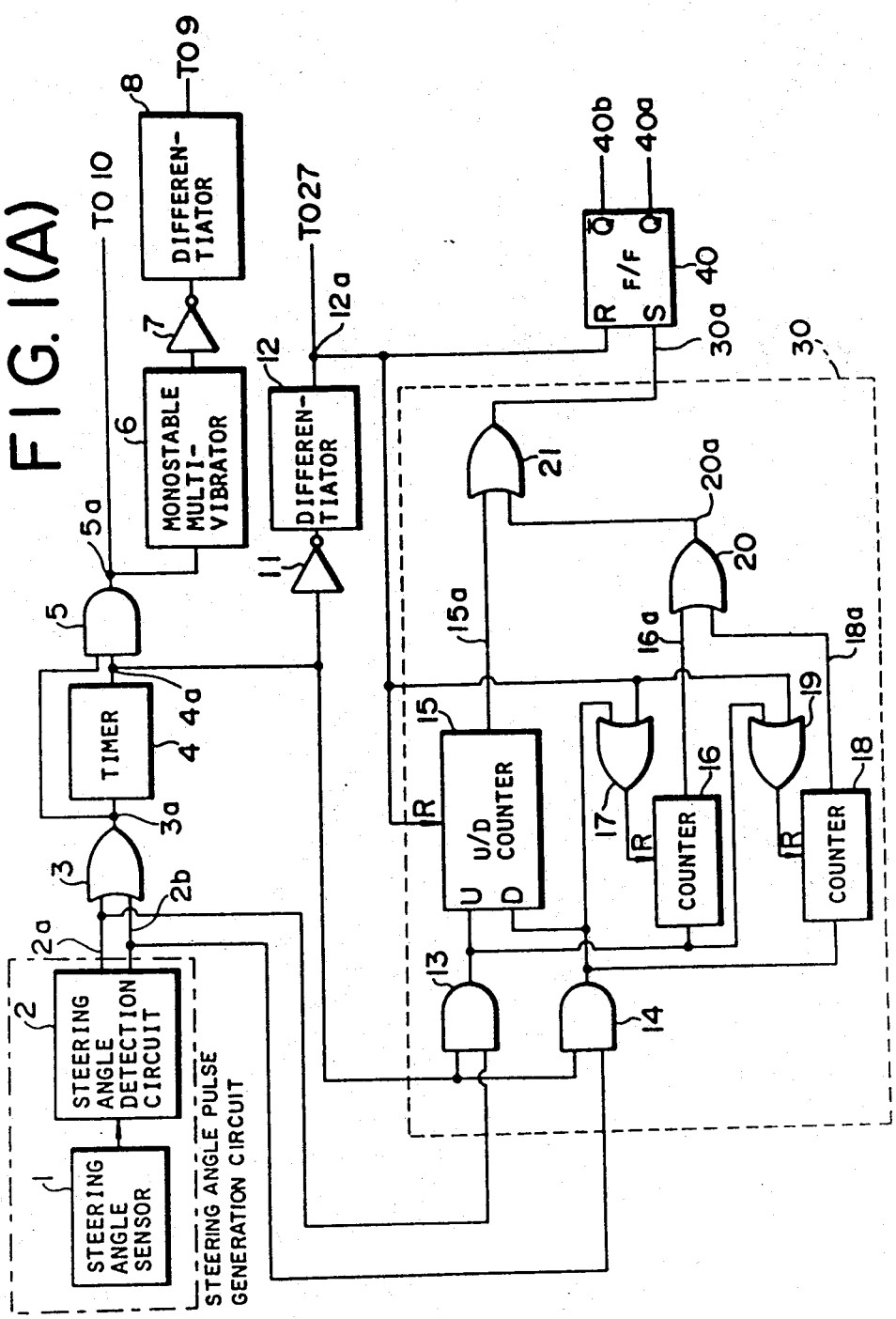

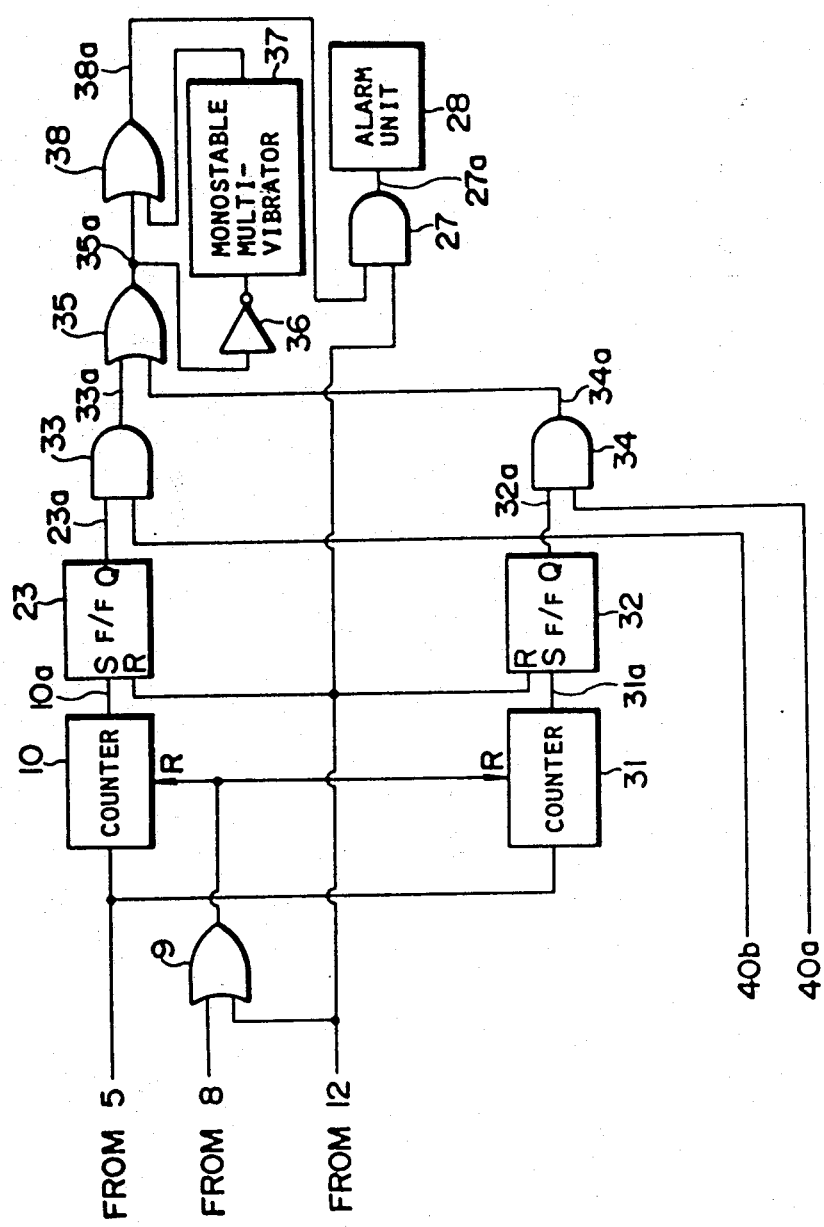

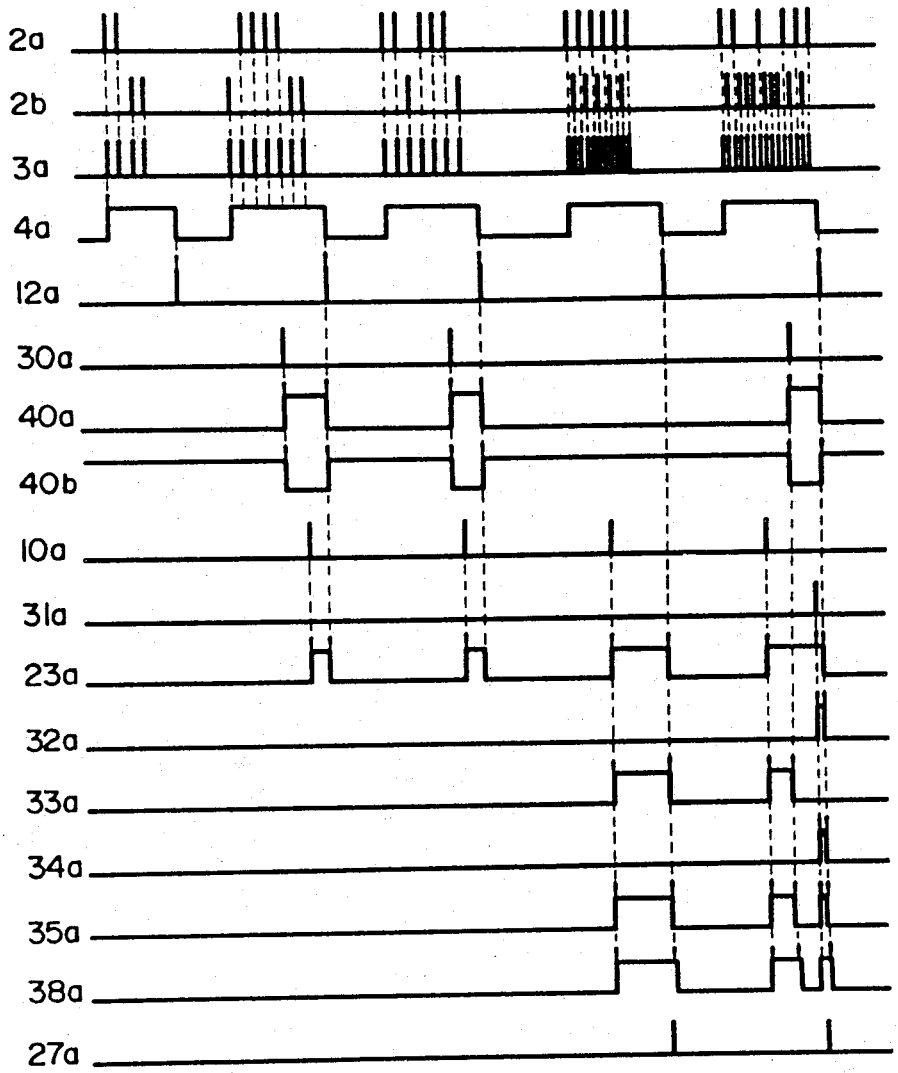

DROWSINESS ALARM SYSTEM FOR A VEHICLE

BACKGROUND OF THE INVENTION

The present invention relates to an alarm system for a vehicle such as an automotive vehicle which gives an alarm when the driver operates the car such as to indicate a state of drowsiness so as to warn the driver, thus preventing driving in an increasing state of drowsiness.

SUMMARY OF THE INVENTION

It is a primary object of the present invention to provide a drowsiness alarm system for a vehicle which gives an alarm to the vehicle driver to prevent the increase in the depth of drowsiness by detecting driver's unnecessary operations of a steering wheel resulting from the driver's failing to take necessary driving caution at both straight road and curved road.

According to the present invention, this is achieved by producing an alarm to the vehicle driver when the driver turns the steering wheel on a straightaway so quickly or frequently that the number of times the steering wheel is rotated in either clockwise or counterclockwise directions through an angle that exceeds a predetermined range of angle reaches a first predetermined number within a predetermined period of time or the driver turns the steering wheel on a curved road so quickly or frequently that the number of times the steering wheel is rotated in either clockwise or counterclockwise direction through an angle that exceeds the predetermined range of angle reaches a second predetermined number greater than the first predetermined number within the predetermined period of time.

BRIEF DESCRIPTION OF THE DRAWINGS

The features and advantages of the alarm system according to the present invention will be better appreciated from the following description taken in conjunction with the accompanying drawings in which like reference numerals designate corresponding elements, and in which:

FIGS. 1A and 1B are simplified circuit block diagrams showing a preferred embodiment of a drowsiness alarm system according to the present invention;

FIG. 2 is an example of a signal timing chart of main circuit blocks shown in FIG. 1;

DETAILED DESCRIPTION OF THE PREFERRED EMBODIMENT

Reference will be made to the drawings and first to FIG. 1 which shows a preferred embodiment of the drowsiness alarm system for a vehicle according to the present invention.

Figure 3A:
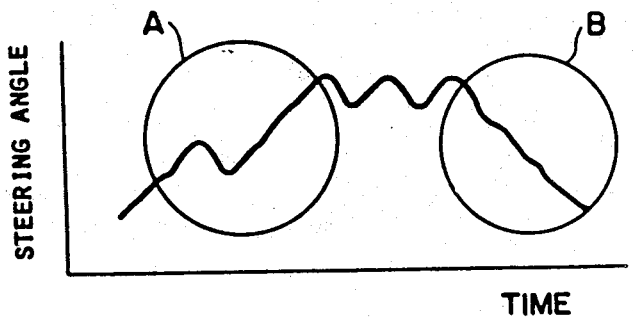
FIG. 3(A) is a signal waveform chart of a steering angle sensor shown in FIG. 1.

In FIG. 1, numeral 1 denotes a steering angle sensor which outputs a voltage signal according to an angular displacement of the steering wheel. FIG. 3A shows an example of the output voltage signal of the steering angle sensor 1. Numeral 2 denotes a steering angle detection circuit. The steering angle detection circuit 2 (construction not illustrated in FIG. 1(A)), in general, comprises: (a) a maximum peak detector which holds a local maximum value of the voltage signal from the steering angle sensor 1; (b) a minimum peak detector which holds a local minimum value of the voltage signal from the steering angle sensor 1; (c) a first subtractor which calculates the difference between the maximum value held by the maximum peak detector and the current voltage signal level from the steering angle sensor 1 at the same time; (d) a second subtractor which calculates the difference between the minimum value held by the minimum peak detector and the current voltage signal level from the steering angle sensor 1; (e) a first comparator which compares the difference output of the first subtractor with a reference voltage and outputs a first pulse 2a when the difference output level of the first subtractor reaches the reference voltage level; (f) a second comparator which compares the difference output of the second subtractor with a reference voltage and outputs a second pulse 2b when the difference output level of the second subtractor reaches the reference voltage level; and (g) a first OR gate, connected to both first and second comparators, which takes logical OR of the first and second pulses 2a and 2b from the first and second comparators, the logical ORed signal thereof being used for resetting both maximum and minimum peak detectors. The reference voltage applied to both first and second comparators corresponds to a predetermined range of steering angle, e.g., 5°. One of two output terminals of the steering angle detection circuit 2 provides the first pulse 2a representing the steering wheel is rotated through a predetermined range of angle clockwise and the other output terminal thereof produces the second pulse 2b representing the steering wheel is rotated through the predetermined range of angle counterclockwise. The steering angle sensor 1 and steering angle detection circuit 2 constitute a steering angle pulse generation circuit. Numeral 3 denotes a second OR gate which takes a logical OR of the first and second pulses 2a and 2b from the steering angle pulse generation circuit. Numeral 4 denotes a first timer for determining the reference time for counting the number of the first and/or second pulses 2a or 2b. First timer 4 may be of a type which outputs a high-level voltage signal for a predetermined period of time, e.g., 15 seconds, from the instant when the steering angle pulse 3a from the second OR gate 3 is received after no steering angle pulse is received for the predetermined period of time. Alternatively, first timer 4 may be of a type which outputs a high-level voltage signal for another predetermined period of time, e.g., 5 seconds, whenever the steering angle pulse 3a from the second OR gate is received so that the duration of the high-level voltage signal outputted therefrom is extended when the interval between each steering angle pulse 3a is within the predetermined period of time. Numeral 5 denotes a first AND gate which enables passage of the steering pulse 3a of either first or second pulse 2a or 2b while the timer 4 outputs the high-level voltage signal. Numeral 6 denotes a first monostable multivibrator which produces a high-level voltage signal for a predetermined period of time, e.g., 3 seconds, whenever one steering angle pulse 5a from the first AND gate 5 is inputted. Numeral 7 denotes a first inverter. Numeral 8 denotes a first differentiator which differentiates an inverted signal of the first inverter 7 so as to detect the falling edge of the high-level voltage signal of the first monostable multivibrator 6. Numeral 9 denotes a third OR gate which takes logical OR between the output pulses of the first differentiator 8 and of the second differentiator 12 which detects the falling edge of the output high-level voltage of the timer 4. Numeral 10 denotes a first counter which counts the number of steering pulses 5a from the first AND gate 5, outputs a third pulse 10a when the counted number reaches a predetermined number, and is reset by the output signal of the second OR gate 9. Numeral 31 denotes a second counter which counts the number of steering pulses from the first AND gate 5, outputs a fourth pulse 31a when the counted number reaches a predetermined number greater than that of the first counter 10. Numeral 23 denotes a first R-S flip-flop, a set terminal of which is connected to the first counter 10 and a reset terminal of which is connected to the second differentiator 12. Numeral 32 denotes a second R/S flip-flop, a set terminal of which is connected to the second counter 31 and reset terminal R of which is connected to the second differentiator 12. Numeral 33 denotes a second AND gate which takes logical AND 33a of the Q output of the first flip-flop circuit 23 and $\bar{Q}$ output of a third R/S flip-flop 40 described hereinafter. Numeral 34 denotes a third AND which takes logical AND 34a of the Q outputs of the second R/S flip-flop 32 and of the third R/S flip-flop 40. Numeral 35 denotes a fourth OR gate which takes logical OR 35a of the output signals of second and third AND gates 33 and 34. Numeral 36 denotes a second inverter. Numeral 37 denotes a second monostable multivibrator which produces a high-level voltage signal for a predetermined period of time (e.g., 0.1 second) so as to detect the falling edge of the output signal of the fourth OR gate 35 via the second inverter 36. Numeral 38 denotes a fifth OR gate which takes logical OR 38a of the output signals of the fourth OR gate 35 and second monostalbe multivibrator 37. Numeral 27 denotes a fourth AND gate which takes logical AND 27a of the output signals 38a and 12a of the fifth OR gate 38 and second differentiator 12. Numeral 28 denotes an alarm unit which produces an alarm in a predetermined form such as buzzer sound, pictorial display, or the like to the driver. Numeral 40 denotes the third R/S flip-flop, the reset terminal R of which is connected to the second differentiator 12 the set terminal S of which is connected to a curved road detection circuit 30. The Q output of the third R/S flip-flop 40 is fed into the third AND gate 34.

Figure 3B:
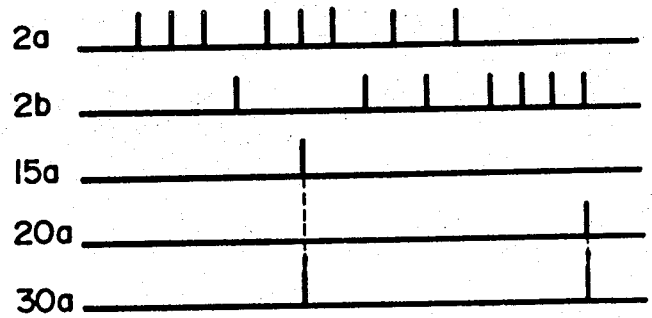
FIG. 3(B) is a signal waveform chart of main circuit blocks shown in FIG. 1.

The curved road detection circuit 30 comprises: (a) two (fifth and sixth) AND gates 13 and 14 which take logical AND of the first pulse 2a from one output terminal of the steering angle detection circuit 2, the second pulse 2b from the other output terminal of the steering angle detection circuit 2, and the high-level voltage signal 4a of the timer 4, respectively; (b) an UP/DOWN counter, an UP terminal U of which is connected to the fifth AND gate 13 and DOWN terminal D of which is connected to the sixth AND gate 14, incrementing the count by one whenever the first pulse 2a from the steering angle detection circuit 2 is received, decrementing the count by one whenever the second pulse 2b from the steering angle detection circuit 2, outputting a fourth pulse 15a when the difference between the counted numbers of the first pulse 2a and the second pulse 2b reaches a predetermined number as shown in FIG. 3(B), and reset by the output pulse 12a of the second differentiator 12; (c) a third counter 16, an input terminal of which is connected to the fifth AND gate 13, counting the number of first pulse 2a passed through the fifth AND gate 13 and outputting a fifth pulse 16a when the counted number reaches a predetermined number, reset by an ORed signal of a sixth OR gate 17 which takes logical OR between the second pulse 2b passed through the sixth AND gate 14 and the output pulse 12a of the second differentiator 12; (d) a fourth counter 18, an input terminal of which is connected to the sixth AND gate 14, counting the number of second pulse 2b passed through the sixth AND gate 14, outputting a sixth pulse 18a when the counted number reaches a predetermined number, e.g., 4, reset by an ORed signal of a seventh OR gate 19 which takes logical OR between the first pulse 2a passed through the fifth AND gate 13 and the output pulse 12a of the second differentiator 12; (e) an eighth OR gate 20 which takes logical OR 20a between the fifth and sixth pulses 16a and 18a of the third and fourth counters 16 and 18; and (f) a ninth OR gate 21 which takes logical OR 15a and 20a between the fourth pulse of the UP/DOWN counter 15 and ORed output of the eighth OR gate 20. The output terminal of the ninth OR gate 21 is connected to the set terminal of the third R/S flip-flop 40.

The operation of the drowsiness alarm system in the preferred embodiment is described with reference to FIG. 2.

When the steering pulses 2a and 2b corresponding to the clockwise direction of the steering wheel (first pulse) and the counterclockwise direction of the steering wheel (second pulse) are fed into the second OR gate 3, the first counter 10 counts the number of the first and second pulses 2a and 2b passed through the second OR gate 3 during the high-level voltage duration of the timer 4. When the counted number reaches a predetermined number, e.g., 7, the first counter 10 outputs the third pulse 10a to set the first R/S flip-flop 23. In addition, when the timer 4 is turned off, the second differentiator 12 outputs the pulse 12a as shown in FIG. 2. On the other hand, when the difference of the counted number between the first pulse 2a and the second pulse 2b passed through the fifth and sixth AND gates 13 and 14 reaches a predetermined value, e.g., 4, the UP/DOWN counter 15 outputs the sixth pulse 15a and the third or fourth counters 16 or 18 outputs the seventh or eighth pulse 16a or 18a when the steering angle pulse 2a or 2b is outputted at almost equal intervals by a predetermined number, e.g., 4. The eighth OR gate 20 outputs a logical OR signal 20a of either the seventh or eighth pulse 16a or 18a. When the sixth pulse 15a of the UP/DOWN counter 15 is outputted as shown in FIG. 3(B) or the ninth pulse 20a of the eighth OR gate 20 which is an ORed signal of the seventh 16a and eighth pulses 18a of the third and fourth counters 16 and 18 as shown in FIG. 3B, the tenth pulse 30a of the ninth OR gate 21 is fed into the third R/S flip-flop 40 to set the third R/S flip-flop 40. At this time, the third R/S flip-flop 40 outputs a set signal 40a as shown in FIG. 2 at the Q output terminal thereof and a reset signal 40b at the $\bar{Q}$ output terminal thereof.

The second counter 31 outputs the fourth pulse 31a upon receipt of a predetermined number of the pulses 3a, e.g., 15 passed through the first AND gate 5, thereby setting the second R/S flip-flop 32 to output a set signal at the Q output terminal. The second R/S flip-flop 32 is reset by the output pulse 12a of the second differentiator 12. The third R/S flip-flop 40 feeds a logical "0" signal 40b from the $\bar{Q}$ terminal thereof to the second AND gate 33 and simultaneously feeds a logical "1" signal 40a from the Q terminal thereof to the third AND gate 34 so that the passage of Q output of the second R/S flip-flop 32 through the third AND gate 34 is enabled until the third R/S flip-flop 40 is reset by the output signal 12a of the second differentiator 12, the passage of Q output of the second R/S flip-flop 32 through the second AND gate 33 is disabled also until reset by the output signal 12a of the second differentiator 12.

After the third R/S flip-flop 40 is reset by the output signal 12a of the second differentiator 12, the third AND gate 34 is in turn disabled and conversely the second AND gate 33 is enabled.

Therefore, the Q output 32a of the second R/S flip-flop 32 is fed into the fourth OR gate 35 as an output of the third AND gate 34, except that the Q output 23a of the first R/S flip-flop 23 is fed into the fourth OR gate 35 as an output of the second AND gate 33. The fourth OR gate 35 outputs a logical OR signal 35a of either of the ANDed output signals of the second and third AND gates 33 and 34. The ORed signal 35a of the fourth OR gate 35 triggers the second monostable multivibrator 37 to turn on for a predetermined period of time, e.g., 0.1 second. Therefore, the fourth AND gate 27 receives the signal 38a from the fifth OR gate, the duration of the signal 38a being the sum of the duration of the ORed signal of the fourth OR gate 35 and the duration having 0.1 second of the output signal of the second monostable multivibrator 37. When the signal 12a indicating the end of measuring the time of frequency of steering changes is fed into the fourth AND gate 27, the fourth AND gate 27 outputs an alarm signal 27a to an alarm unit 28 thereby the alarm unit 28 producing an alarm to the driver. It is noted that in this preferred embodiment the first differentiator 8 outputs an output signal 8a to the first and second counters 10 and 31 for resetting the first and second counters 10 and 31 when the steering pulse 3a of the second OR gate 3 does not appear for a predetermined period of time, e.g., 3 seconds.

According to the present invention, there is provided a drowsiness alarm system comprising: (a) a counter which counts the number of steering pulses generated for both the clockwise and counterclockwise directions, a steering pulse corresponding to a predetermined range of angle of the steering wheel; (b) a curved road detection circuit which detects the vehicle does not travel on a curved road when the difference of the counted number for each rotating direction is below a predetermined number or when the steering pulse in either of the rotating direction does not appear serially at almost equal intervals by a predetermined number; and (c) an alarm unit which produces an alarm to the driver when the counted number reaches a first predetermined number upon receipt of a signal representing the vehicle does not travel on a curved road from the curved road detection circuit and when the counted number reaches a second predetermined number upon receipt of another signal representing the vehicle travels on a curved road from the curved road detection circuit, the second predetermined number being greater than the first predetermined number. Consequently, the drowsiness alarm system according to the present invention can detect the driver's increasing state of drowsiness accurately even through the vehicle travels on a curved road.

It will be fully understood by those skilled in the art that the foregoing description is in terms of preferred embodiment of the present invention wherein various changes and modifications may be made without departing from the spirit and scope of the invention, which is to be defined by the appended claims.

What is claimed is:

1. A drowsiness alarm system for a vehicle for producing a warning in the event of driver drowsiness as determined from vehicle steering changes, comprising:
   (a) a steering angle pulse generation circuit which produces a clockwise steering angle pulse at one of two output terminals whenever the steering wheel is rotated clockwise through an angle equal to a predetermined angular increment and produces a counterclockwise steering angle pulse at the other output terminal whenever the steering wheel is rotated counterclockwise through an angle equal to the predetermined angular increment;
   (b) a first steering angle pulse counting circuit which counts the number of both clockwise and counterclockwise steering angle pulses inputted thereto sequentially to one another within a first predetermined period of time and outputs a first voltage signal whenever the counted number reaches a first predetermined number within a second predetermined period of time;
   (c) a second steering angle pulse counting circuit which counts the number of both clockwise and counterclockwise steering angle pulses inputted thereto sequentially to one another within the first predetermined period of time and outputs a second voltage signal whenever the counted number reaches a second predetermined number within the second predetermined period of time;
   (d) a curved road detection circuit which counts the number of the clockwise and counterclockwise steering angle pulses, separately, inputted thereto within the second predetermined period of time and outputs a pulse whenever the counted number of either of the clockwise or counterclockwise steering angle pulses inputted thereto reaches a third predetermined number or whenever the difference of the counted numbers between the clockwise and counterclockwise steering angle pulses reaches a fourth predetermined number;
   (e) a signal switching circuit, connected between said first and second steering angle pulse counting circuits and said curved road detection circuit, which selectively enables the passage of either of the first or second voltage signals depending on whether said curved road detection circuit sends the output pulse thereto; and
   (f) an alarm section which produces an alarm in a predetermined form in response to a pulse received when said signal switching circuit enables the passage of either of the first or second voltage signals.

2. A drowsiness alarm system for a vehicle as set forth in claim 1, wherein the second predetermined number of said second steering angle pulse counting circuit is greater than the first predetermined number of said first steering angle pulse counting circuit.

3. A drowsiness alarm system for a vehicle as set forth in claim 1, wherein said first steering angle pulse counting circuit comprises:
   (a) an OR gate, connected to both output terminals of said steering angle pulse generation circuit, which takes logical OR of both clockwise and counterclockwise steering angle pulses from said steering angle pulse generation circuit;
   (b) a timer, connected to said OR gate, which outputs a third voltage signal for the second predetermined period of time in response to the output signal of said OR gate so as to determine the reference time for counting clockwise and counterclockwise steering angle pulses;

(c) an AND gate, connected to said OR gate and timer, which enables the passage of the output signal of said OR gate while the third voltage signal is received from said timer;

(d) a reset circuit, connected to said timer, which produces a reset pulse whenever the third voltage signal outputted from said timer drops to zero;

(e) a counter, connected to said AND gate, which counts the number of the clockwise and counterclockwise steering angle pulses passed through said AND gate, outputs a pulse whenever the counted number reaches the first predetermined number, and is reset in response to the reset pulse from said reset circuit; and (f) a flip-flop, connected to said counter and to said reset circuit, which continues to produce a fourth voltage signal until the reset pulse of said reset circuit is received at the reset terminal thereof in response to the pulse outputted from said counter.

4. A drowsiness alarm system for a vehicle as set forth in claim 3, wherein said second steering angle pulse counting circuit comprises:

(a) a second counter, connected to said AND gate, which counts the number of the clockwise and counterclockwise steering angle pulses, outputs a pulse whenever the counter number reaches the second predetermined number, and is reset in response to a reset pulse of said reset circuit passed through said OR gate; and (b) a second flip-flop, connected to said second counter and to said reset circuit, which continues to produce a fifth voltage signal in response to the pulse outputted from said second counter until the reset pulse of said reset circuit is received.

5. A drowsiness alarm system for a vehicle as set forth in claim 3, further comprising:

(a) a second reset circuit, connected to said AND gate, which produces a second reset pulse whenever the output pulse signal of said AND gate is received at an interval exceeding a third predetermined period of time; and (b) a second OR gate, connected to both said reset circuits, which takes logical OR of the reset pulses fed from the respective reset circuits;

whereby said counter is resettable in response to a reset pulse of either of the reset circuits passed through said second OR gate.

6. A drowsiness alarm system for a vehicle as set forth in claim 5, wherein said second steering angle pulse counting circuit comprises:

(a) a second counter, connected to said AND gate, which counts the number of the clockwise and counterclockwise steering angle pulses, outputs a pulse whenever the counter number reaches the second predetermined number, and is reset in response to a reset pulse of either of said reset circuits passed through said second OR gate; and (b) a second flip-flop, connected to said second counter and to the first recited reset circuit, which continues to produce a fifth voltage signal in response to the pulse outputted from said second counter until the reset pulse of the first recited reset circuit is received.

7. A drowsiness alarm system as set forth in claim 5, wherein said second reset circuit comprises:

(a) a monostable multivibrator, connected to said AND gate, which produces a fifth voltage signal for the third predetermined period of time whenever the steering angle pulse passed through said AND gate is received;

(b) an inverter, connected to said monostable multivibrator, which inverts the level of the fifth voltage signal of said monostable multivibrator; and (c) a differentiator, connected to said inverter, which produces the second reset pulse when the output voltage signal is received from said inverter so as to detect the falling edge of the fifth voltage signal of said monostable multivibrator.

8. A drowsiness alarm system for a vehicle as set forth in claim 3, wherein said curved road detection circuit comprises:

(a) a second AND gate, connected to said steering angle pulse generation circuit and to said timer, which enables the passage of the clockwise steering angle pulse from said steering angle pulse generation circuit while the third voltage signal from said timer is received;

(b) a third AND gate, connected to said steering angle pulse generation circuit and to said timer, which enables the passage of the counterclockwise steering angle pulse while the third voltage signal from said timer is received;

(c) an UP/DOWN counter, connected to said second and third AND gates, which increments the count by one whenever the clockwise steering angle pulse passed through said second AND gate is received, decrements the count by one whenever the counterclockwise steering angle pulse passed through said third AND gate is received, outputs a fourth pulse whenever the difference between the incrementally counted number and the decrementally counted number reaches the fourth predetermined number, and is reset in response to the reset signal from said reset circuit;

(d) a second OR gate, connected to said third AND gate and to said reset circuit, which takes logical OR of the counterclockwise steering angle pulse from said third AND gate and said reset signal from said reset circuit;

(e) a second counter, connected to said second AND gate, which counts the number of the clockwise steering angle pulse passed through said second AND gate, outputs a fifth pulse whenever the counted number reaches the third predetermined number, and is reset in response to the counterclockwise steering angle pulse or reset pulse passed through said second OR gate;

(f) a third OR gate, connected to said second AND gate and to said reset circuit, which takes logical OR of the clockwise steering angle pulses passed through said second AND gate and the reset signal from said reset circuit;

(g) a third counter, connected to said third AND gate, which counts the number of the counterclockwise steering angle pulse passed through said third AND gate, outputs a sixth pulse whenever the counted number reaches the third predetermined number, and is reset in response to a clockwise steering angle pulse or reset pulse passed through said third OR gate; and (h) a fourth OR gate, connected to said UP/DOWN counter, second, and third counters, which takes logical OR of the fourth, fifth, and sixth pulses of said UP/DOWN counter, second, and third counters.

9. A drowsiness alarm system for a vehicle as set forth in claim 3, wherein said signal switching circuit comprises:
(a) a second flip-flop, connected to said curved road detection circuit and to said reset circuit, which outputs a fifth voltage signal in response to the output pulse from said curved road detection circuit, the fifth voltage signal being inverted by the reset pulse fed from said reset circuit;
(b) a second AND gate, connected to said first steering angle pulse counting circuit and to said second flip-flop, which enables the passage of the first voltage signal of said first steering angle pulse counting circuit in response to a sixth voltage signal from said second flip-flop outputted when said second flip-flop does not produce the fifth voltage signal; and
(c) a third AND gate, connected to said second steering angle pulse counting circuit and to said second flip-flop, which enables the passage of the second voltage signal of said second steering angle pulse counting circuit when said second flip-flop sends the fifth voltage signal thereto.

10. A drowsiness alarm system for a vehicle as set forth in claim 3, wherein said alarm section comprises:
(a) an inverter, connected to said signal switching circuit, which inverts the level of the voltage signals selectively passed through said signal switching circuit;
(b) a monostable multivibrator, connected to said inverter, which produces a fifth voltage signal for a third predetermined period of time when the output signal of said inverter goes high so as to detect the falling edge of the voltage signal of either of said first and second steering angle pulse counting circuits fed through said signal switching circuit;
(c) a second OR gate, connected to said signal switching circuit and to said monostable multivibrator, which takes logical OR of the voltage signal selectively passed through said signal switching circuit and the fifth voltage signal outputted from said monostable multivibrator;
(d) a second AND gate, connected to said second OR gate and to said reset circuit, which enables the passage of the first reset pulse fed from said reset circuit when the output voltage signal of said second OR gate is received; and
(e) an alarm unit, connected to said second AND gate, which produces an alarm in a predetermined form in response to the first reset pulse through said second AND gate.

11. A drowsiness alarm system for a vehicle as set forth in claim 3, wherein said first reset circuit comprises:
(a) an inverter, connected to said timer, which inverts the level of the third voltage signal fed from said timer; and
(b) a differentiator, connected to said inverter, which produces the first reset pulse when the voltage signal is received from said inverter so as to detect the falling edge of the third voltage signal outputted from said timer.

* * * * *